March 9, 1954  W. R. KRAMER  2,671,541
SEALING STRIP
Filed May 14, 1951
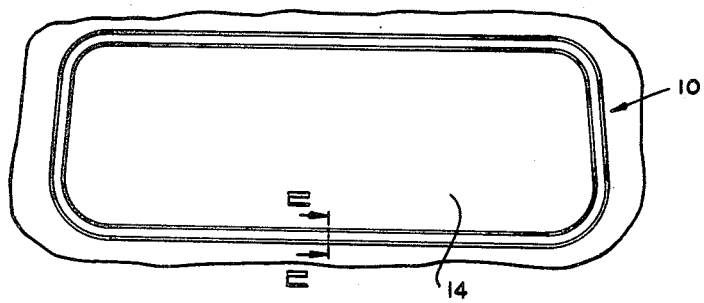
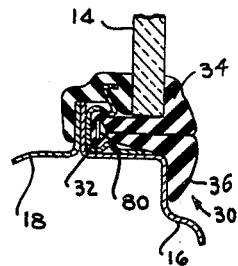
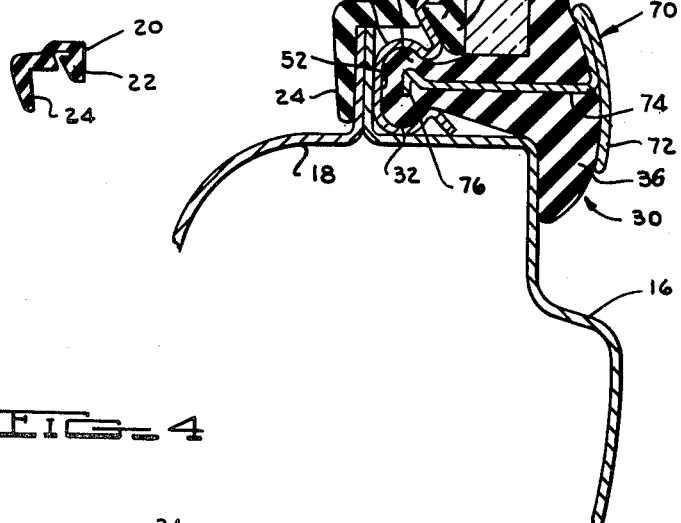
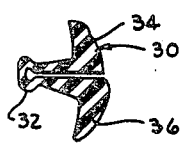
INVENTOR.
WILLIAM R. KRAMER
BY
ATTORNEY Patented Mar. 9, 1954

2,671,541

UNITED STATES PATENT OFFICE 2,671,541

SEALING STRIP

William R. Kramer, Birmingham, Mich.

Application May 14, 1951, Serial No. 226,215

9 Claims. (Cl. 189—78)

The present invention relates to a sealing strip and more particularly to a resilient sealing strip which is adapted for joining separate panels disposed essentially in edge-to-edge relationship. For example, the sealing strip disclosed herein may be used for mounting a fixed glass panel in an opening provided in a sheet metal panel, such as is used in the automotive field wherein glass panels are conventionally used as fixed windshields and fixed rear body windows.

The sealing devices in use at the present time consist of an elastic or resilient extruded channel strip which provides a recessed portion in which the edges of the glass panel are mounted and in which other portions are provided for engagement with a structural part of the car body as, for example, the edges of the sheet metal body panel for holding the channel strip and glass plate in place in the body opening. Due to the variations in the dimensions of the glass panels and of the openings in the sheet metal panels, it has been found that in the mass manufacture of automobiles, the resilient channel strip is frequently deformed in such a manner as to make it difficult to secure the necessary water-tight seal between the edges of the glass panel and the edges of the body panel.

The rubber or resilient plastic composition of which the above prior sealing strips have been formed have been found to age and deteriorate and, accordingly, to lose their original resiliency, such that leakage will occur, both between the strip and the glass and between the strip and the edges of the opening in the automobile body.

In addition, the prior sealing strips have been conventionally formed of a single piece of yieldable cushioning material which provides a channel for receiving the edges of both the glass panel and the body panel and thus, a portion of the cushioning material is visible on each side of the sealed joint. Frequently, it is desired to decorate the interior and exterior, such as of automobiles, in contrasting or dissimilar colors. In such cases, it has been necessary to provide a cushioning material of a neutral color, such as black, rather than to complete the color scheme of one or the other with a correspondingly colored cushioning material.

It is, accordingly, a principal object of this invention to provide a resilient sealing strip which provides a weather-tight joint and a cushioned mounting for the edges of the glass panel mounted therein and in which the resilient sealing strip is rigidly held under compression to draw the resilient sealing material into intimate weather-tight contact along the entire edges of the joined panels and to maintain such intimate contact during the entire service life of the strip.

It is a further object of the present invention to provide a sealing strip which can be installed economically and easily by unskilled workmen and which will compensate for slight variations in the dimensions of the glass plate and of the opening in the automobile body so as to permit their use in large scale mass assembly operations.

It is another object of this invention to provide a sealing strip in which the outside garnish molding is used in the assembly of the panels and also maintains the resilient sealing material under compression and in intimate contact with both the glass panel and the automobile body panel.

Another object is to provide a sealing strip provided with separate yieldable cushioning members on opposite sides of the glass panel, such that the separate members may have a color corresponding to the particular color scheme desired on the exterior and interior thereof.

Other objects of this invention will appear in the following description and appended claims, reference being had to the accompanying drawings forming a part of this specification, wherein like reference characters designate corresponding parts in the several views.

In the drawings:

Fig. 1 is a fragmentary elevational view showing a sealing strip embodying the features of the present invention in assembled relation with a glass panel and an automobile body panel;

Fig. 2 is an enlarged sectional view taken substantially on the line 2—2 of Fig. 1;

Fig. 3 is a sectional view of the inside cushion and cover member showing the same prior to assembly with the other component parts of the sealing strip; and Fig. 4 is a sectional view of the outside weather-sealing member prior to assembly with the other component parts of the sealing strip.

Fig. 5 is a sectional view of a modification of the invention.

Before explaining the present invention in detail, it is to be understood that the invention is not limited in this application to the details of construction and arrangement of parts illustrated in the accompanying drawings, since the invention is capable of other embodiments and of being practiced and carried out in various ways. Also, it is to be understood that the phraseology or terminology employed herein is for the purpose of description and not of limitation.

In its preferred embodiment, the sealing strip of the present invention consists of a pair of yieldable body portions, each comprising a preformed, contoured, non-metallic strip, preferably formed of an elastomeric plastic, such for example, as a polyvinyl material or a rubber compound. The sealing strip also includes a rigid retaining member secured to the edge of the automobile body panel and providing a bead-receiving channel having a restricted opening through which it is adapted to receive a correspondingly shaped deformable bead provided by one of the yieldable body portions. The latter is also provided with a molding having a reinforcing plate extending through the center of the yieldable body portion and terminating within the resilient bead, such that the garnish or finish molding provides a clamping and holding action which holds the flanges of the yieldable non-metallic cushioning strips under compression and in weather-tight engagement with the adjacent edges of the connected panels.

While the invention is here disclosed for use in automobile body constructions, it is to be understood that its use is not limited to this field as the strip may be used to advantage in any construction where adjacent panel edges are to be joined in a weather-tight joint. Other adaptations of the present invention include, by way of example, panels used in prefabricated building constructions, window glass mountings used in all types of vehicles, and window glass mountings used in the construction industry, particularly the large fixed glass panels frequently identified as so-called "picture windows."

The yieldable non-metallic body portions are separately formed by any known molding or extrusion processes and can be supplied in long lengths from which portions of the proper lengths may be cut if desired. The non-metallic cushioning strip provided with the deformable bead is provided with a recessed groove into which the metallic molding is adapted to be inserted.

With reference to the drawings, the sealing strip 10 comprises a yieldable, non-metallic cushioning member, including an inside cushion and cover member 20, Fig. 3, and an outside cushion and weather-sealing member 30, Fig. 4, which provides a recess 12, Fig. 2, for receiving and cushioning the edge of the glass panel 14. The sealing strip 10 also includes a retainer ring 50 or segments of same adapted to be secured, such as by spot welding, around an opening in a body panel 16 and 18 and which provides a bead-receiving channel 52 having a restricted opening 54 therein.

The outside weather-sealing member 30 is formed in substantially T-shaped cross section, the end of the body portion thereof being provided with a deformable bead 32, which during assembly of the sealing strip is adapted to be forced through the restricted opening 54 into the bead-receiving channel 52 and is held therein by virtue of the resilience of the yieldable, non-metallic material of which it is formed and by the limited flexibility of the rigid retaining ring.

A rigid molding 70 is also provided for facilitating insertion of the bead into the channel 52 and for maintaining the yieldable material of the cushioning members 20 and 30 under compression and against both sides of the glass panel 14 and against the portion 16 of the body panel.

As shown particularly in Fig. 2, the molding 70 comprises a plate portion 72 which also serves as the garnish or finish molding for the assembly, and a reinforcing plate 74 formed integral therewith and which extends centrally through the body portion of the weather-sealing member 30. The latter reinforcing plate 74 terminates in a flange 76 disposed within the bead 32 and effectively increases the area of the reinforcing plate so as to prevent puncturing of the yieldable material during the assembly of the sealing strip 10. The flange 76 also increases the rigidity of the bead so as to assist in maintaining the bead within the groove and prevents withdrawal of the molding 70 once the sealing strip is assembled, so as to permit a positive pressure application on the flared portions 34 and 36 of the weather-sealing member 30 against the panels 14 and 16.

As shown particularly in Fig. 2, the retaining ring 50 is provided with an upwardly extending flange 56 which, in cooperation with the glass panel 14, forms an enlarged cavity 60 for retaining the enlargement 22 of the inside cushion and cover member 20 and for locking said cover member in assembled relation with the other component parts of the sealing strip. The inside cushion member 20 is also provided with a lip 24 which overlaps the edge of the body panel 16 and 18 and forms a weather-tight seal therewith. As will be noted in Fig. 3, the lip 24 is formed on the cushion member at a slight angle to its normal assembled position so as to be pressed tightly against the edge of the body panel in its assembled position.

While the retaining ring is stated to be formed of a rigid material, this material has sufficient flexibility so as to flex outwardly upon insertion of the bead 32 of the outside weather-sealing member and thus tends to maintain the resilient material of the enlargement 22, the bead 20 and the flanges 34 and 36 under compression, even after this material has aged and partially set.

As shown herein, the garnish molding and the reinforcing plate 74 are formed from a single piece of sheet metal, the upper half of the garnish molding being two-ply and the upper flare 34 of the T-shaped outside sealing member being recessed slightly to compensate for the additional thickness of this portion of the garnish molding. As shown in Fig. 4, each of the flared portions 34 and 36 normally extend inwardly so as to be pressed tightly against the panels 14 and 16 in the assembled position thereof.

In assembly, the retaining ring 50 and the two sections of the body panel 16 and 18 are preferably welded together simultaneously, such as by spot welding around the opening in the panel. Preferably, the two sections of the body panel and the retaining ring are spot welded together in one operation. The inside cushion and cover member 20 is then positioned on the upper flange 56 of the retaining ring 50, having the lip 24 forming a seal over the edges of the body panel 16 and 18. The glass panel 14 is then placed over the opening in the body panel and the outside weather-sealing member is inserted in position, whereby the bead 32 may be forced into the channel 52 of the retaining ring 50 by a pressure applied to the garnish molding 72, such as by the use of a rubber or other non-marring hammer.

A modification of the invention is shown in Fig. 5 of the drawing wherein the garnish molding may be merely used to install the outer weather-sealing member and then removed so that the outside will simply be rubber or elastomer. In this modification, the flange 80 is separate from the other portions of the molding and is retained within the deformable head 32 after assembly of the sealing strip. The portions of the weather-sealing member 30 between the flanges 38 and 39 and the deformable bead 32 are under stress in its operative position so that the flanges 34 and 36 are retained firmly against the panels 14 and 16.

From the foregoing, it will be seen that I have provided a sealing strip in which a pair of separate yieldable non-metallic cushioning strips are provided to engage the edges of the panels to be connected and in which the strips are adapted to have separate colors that will conform to the interior and exterior color schemes, such as of an automobile. The sealing strip is provided with a rigid molding which may form a permanent part of the assembly and which, when used, strengthens the connection between the panels and maintains the yieldable material under compression to increase the tightness of the seal during the entire service life of the strip. When the molding is not made a permanent part of the sealing strip, it serves during the assembling operation as a tool to install the outer sealing member, and thereafter the flanges of the sealing members are held against the panels by their own resilient characteristics. In addition, the sealing strip disclosed herein is characterized by simplicity and economy in both manufacture and assembly and has sufficient flexibility to make it highly suitable for use in mass production assembly operations.

Having thus described my invention, I claim:

1. A sealing strip for retaining a second panel within an opening in a first panel, said sealing strip comprising a retaining ring secured around the edge of the opening in said first panel, said retaining ring including a bead-receiving channel having a restricted opening therein; a resilient, non-metallic cushioning member surrounding the edge of said second panel and having an inner cushion portion thereon overlapping the inner surface of said second panel and an outer cushion portion thereon overlapping the outer surfaces of both the first and second panels, said cushioning member also having a deformable bead portion projecting beyond the inner surface of said second panel member and being positioned within the bead-receiving channel of said retaining ring to hold said cushioning member in position around the opening in said first panel and to retain the second panel in position within said opening.

2. A sealing strip in accordance with claim 1 and being further characterized in that a relatively rigid molding is provided having a reinforcing plate within said cushioning member and terminating within said deformable bead.

3. A sealing strip in accordance with claim 2 and further characterized wherein said relatively rigid molding is also provided with a garnish molding overlapping the adjacent edges of said panels and adapted to maintain yieldable cushioning material disposed between the garnish molding and the panels under compression.

4. A sealing strip for connecting adjacent edges of panels and for sealing the joint therebetween, said sealing strip comprising a pair of yieldable non-metallic cushions providing a recess for receiving one of said panels, and a retaining ring secured to the other panel and providing a bead-receiving channel having a restricted opening therein extending along the edge of said second panel, one of said cushions having a deformable bead adapted to be forced through said restricted opening upon deformation thereof into said bead-receiving channel and retained therein to hold the sealing strip in assembled relation.

5. A sealing strip in accordance with claim 4 and being further characterized in that a rigid molding is disposed within the last-mentioned cushion having a portion extending into said deformable bead and also having a molding plate overlapping the adjacent edges of said panels for maintaining the yieldable cushioning material under compression and against said panels.

6. A sealing strip for connecting the edge of a glass panel and the edge surrounding an opening in a body panel and for sealing the joint therebetween, said sealing strip comprising a retaining ring secured to said body panel and positioned along the opening therein, said retaining ring providing a bead-receiving channel having a restricted opening therein and also having a flange cooperating with the glass panel to form a second channel, a yieldable non-metallic cushion and cover member having a portion overlapping the edge of the body panel and also having an enlarged portion extending into said second channel to cushion said glass panel relative to said body panel, a yieldable non-metallic weather-sealing member engaging said glass panel on the opposite side thereof and cooperating with the enlarged portion of said cushion and cover member to form a recess for receiving the edge of said glass panel and having another portion engaging said body panel, said weather-sealing member also having a deformable bead extending into the bead-receiving channel in said retaining ring and adapted to effect a slight flexing of the same in the assembled position of said bead, and a rigid molding for use in forcing the deformable bead through said restricted opening and into the bead-receiving channel of said retaining ring and for maintaining said yieldable material of said weather-sealing member under compression and against said panels, said molding comprises a molding plate overlapping the edges of said body panel and said glass panel and engaging portions of said weather-sealing member disposed between said plate and panels and a reinforcing plate extending into said weather-sealing member and terminating in said deformable bead.

7. A sealing strip in accordance with claim 6 and being further characterized in that the reinforcing plate of said molding is provided with a flanged end disposed within said deformable bead.

8. A sealing strip for retaining a second panel within an opening in a first panel, said sealing strip comprising a retaining ring secured around the edge of the opening in said first panel, said retaining ring including a bead-receiving channel therein having a restricted opening, a flange on said retaining ring cooperating with said second panel to form a cushion receiving channel; a resilient, non-metallic cushioning member comprising an inner cushion and an outer cushion, a portion of said inner cushion being positioned within the cushion receiving channel of said retaining ring, said outer cushion surrounding the edge of said second panel and overlapping the outer surfaces of both the first and second panel, said outer and inner cushions thus providing a cushioned recess around the opening in said first panel to receive the edge of said second panel, said outer cushion also having a deformable bead portion projecting beyond the inner surface of said second panel member, said deformable bead portion being positioned within the bead-receiving channel of said retaining ring to hold said cushioning member in position around the opening in said first panel and to retain the second panel in position within said opening.

9. A sealing strip in accordance with claim 8 and further characterized in that a rigid molding is disposed within said outer cushion having a portion extending into said deformable bead and also having a molding plate overlapping the adjacent edges of said panels for maintaining the yieldable cushioning material under compression and against said panels.

WILLIAM R. KRAMER.

References Cited in the file of this patent

UNITED STATES PATENTS

| Number | Name | Date |
|---|---|---|
| 1,804,799 | Palenske et al. | May 12, 1931 |
| 2,204,769 | Potter | June 18, 1940 |
| 2,214,918 | Ball | Sept. 17, 1940 |
| 2,350,430 | Ulrich | June 6, 1944 |
| 2,497,957 | Pelley | Feb. 21, 1950 |
| 2,549,315 | Kramer | Apr. 17, 1951 |
| 2,556,775 | Oswald | June 12, 1951 |

FOREIGN PATENTS

| Number | Country | Date |
|---|---|---|
| 531,863 | Great Britain | Jan. 13, 1941 |